A. RECHNITZER.
CALCULATING MACHINE.
APPLICATION FILED OCT. 12, 1908.
1,398,945.
Patented Nov. 29, 1921.
2 SHEETS—SHEET 1.
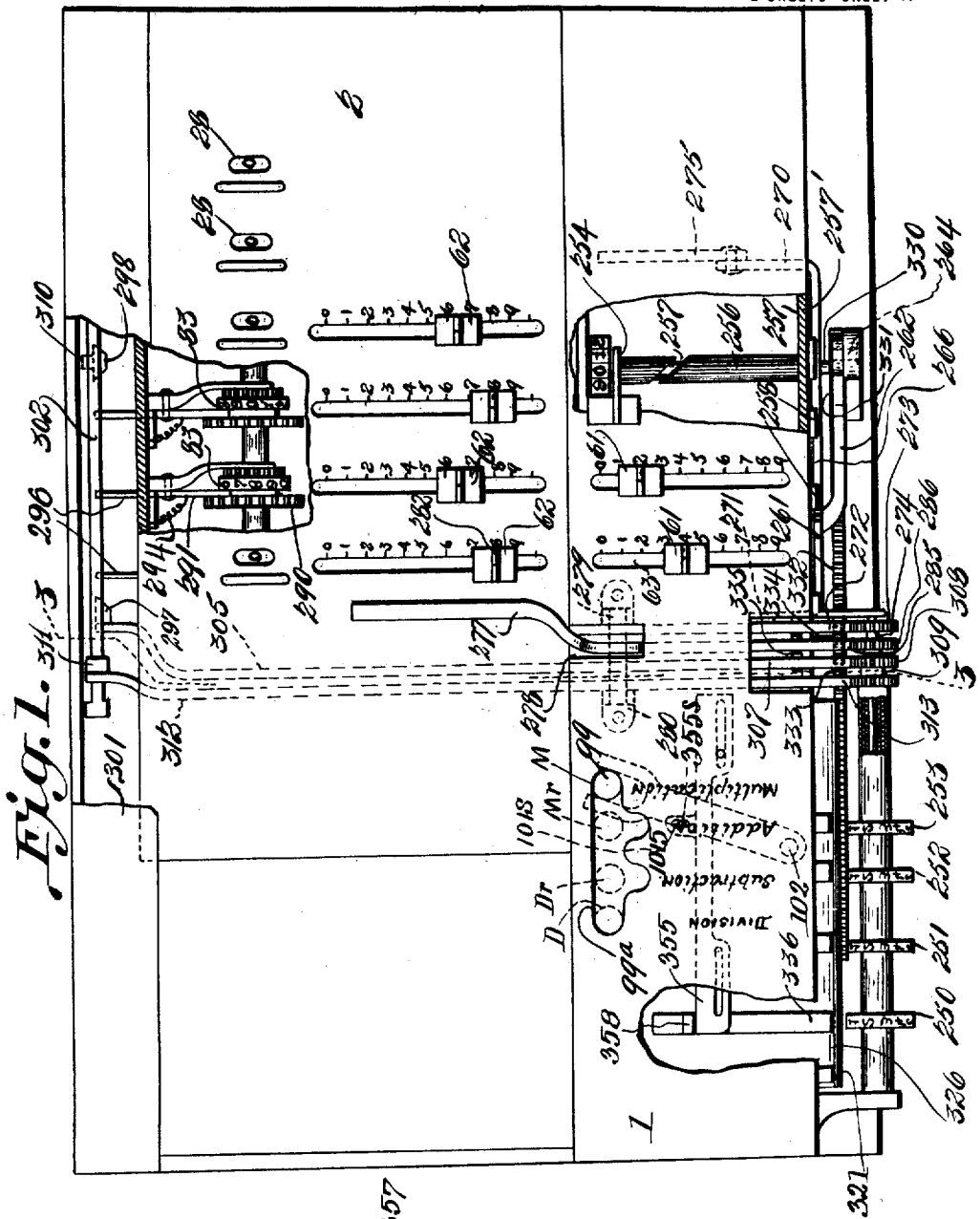
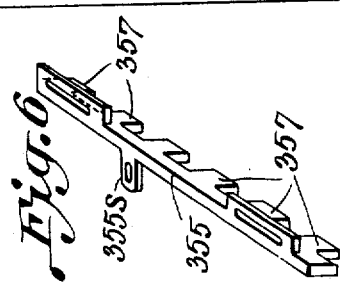
Witnesses
E. A. Jarris
H. Jackson
Inventor:
Alexander Rechnitzer
by Newell Neal
attorneys A. RECHNITZER.
CALCULATING MACHINE.
APPLICATION FILED OCT. 12, 1908.
1,398,945.
Patented Nov. 29, 1921.
2 SHEETS—SHEET 2.
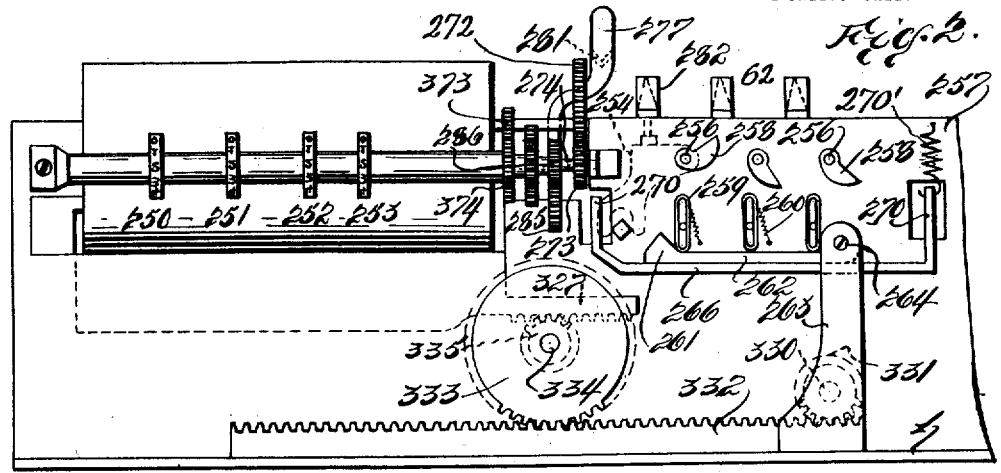
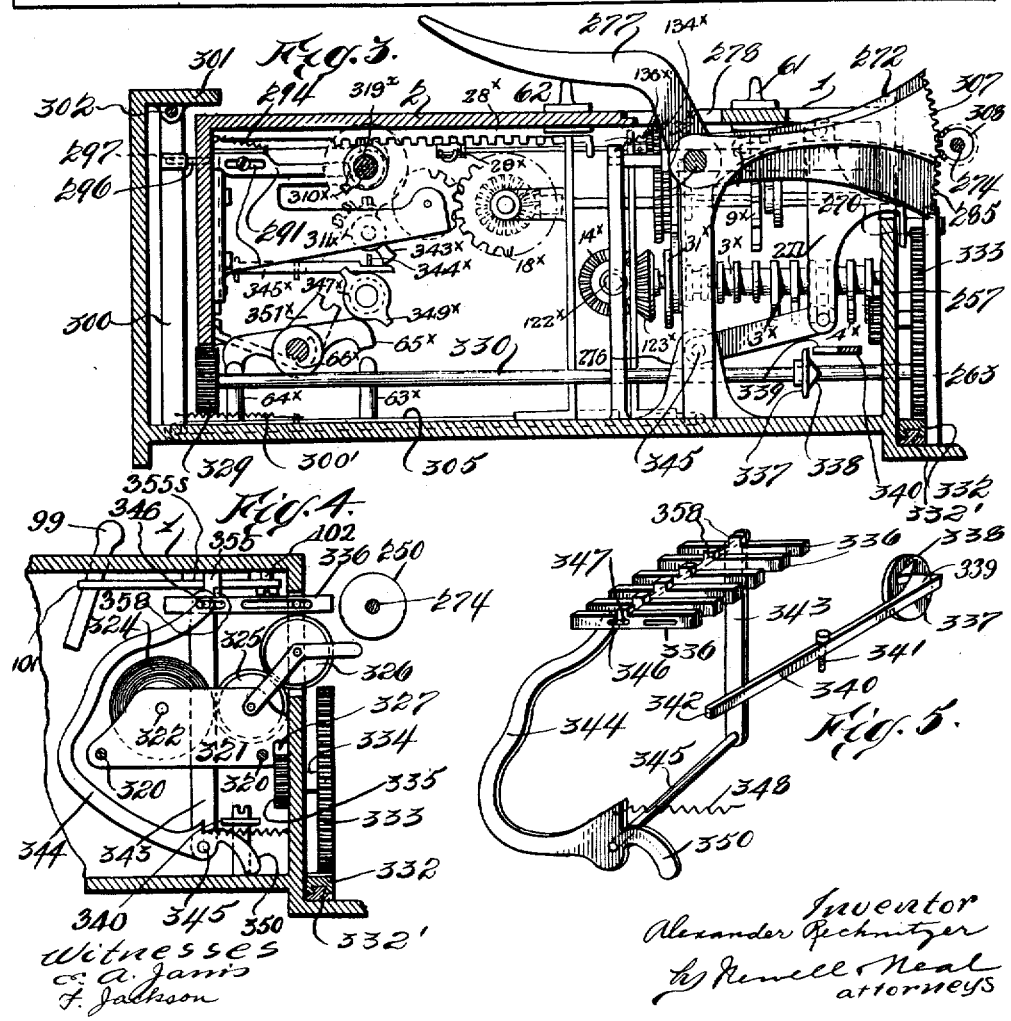

UNITED STATES PATENT OFFICE.

ALEXANDER RECHNITZER, OF BERLIN, GERMANY, ASSIGNOR TO AUTARIT-GESELLSCHAFT M. B. H., OF VIENNA, AUSTRIA.

CALCULATING-MACHINE.

1,398,945.   Specification of Letters Patent.   Patented Nov. 29, 1921.

Application filed October 12, 1908. Serial No. 457,414.

*To all whom it may concern:*

Be it known that I, ALEXANDER RECHNITZER, a subject of the King of Hungary, and residing at Berlin, Germany, have invented new and useful Improvements in Calculating-Machines, of which the following is a full, clear, and exact description.

The object of the present invention is to provide a practical printing apparatus for calculating machines, especially for those adapted for multiplication and division. By such machines is meant all kinds of calculating machines, wherein to enable a rapid carrying out of multiplications and divisions a carriage is displaced or shifted with reference to a registering mechanism to the various place values of the same, so that the additions of the partial products or the subtractions of the partial quotients can take place rapidly at the various place values.

This class of calculating machines need, especially, simplicity in the construction of a printing apparatus, intended to be used with it. There are three different numbers (multiplicand, multiplier and product,—or dividend, divisor, and quotient), which ought to be printed; and, furthermore, these numbers must necessarily be mounted in different and separated parts of the calculating mechanism, as one of the numbers (either the multiplier or the product) must be mounted on a carriage, because one number must be shiftable to different place values with regard to the others. And as it is of course also desirable to have all these numbers transmitted to, and printed upon, one sheet of paper, the transmitting apparatus from such numbers represented in different parts of the calculating mechanism to the several printing means which must be arranged opposite a single paper, must be especially simple and adaptable or else a complication would result, putting the printing mechanism beyond practical use.

A printing apparatus, meeting all these conditions is the object of the present invention, which also will be useful in connection with any kind of calculating or registering apparatus. The main idea of the invention is to provide for several numeral wheels (or any other device adapted to represent figures) a single common transmitting and printing mechanism, by using a sort of testing lever which is caused to strike off the different positions of a plurality of numeral wheels successively and so to transmit it to a single printing wheel which therefore will also be adjusted successively to print the numbers transmitted, in a manner similar in function to that of a printing wheel of a telegraph apparatus. If the transmitting or sending apparatus of such a printing telegraph apparatus were made not to be operated by a clerk, but by a calculating machine, to automatically strike off certain numbers represented in its mechanisms, then such arrangement would embody the main idea of this invention. In other words, instead of using for each registering wheel a separate printing wheel, and (if the printing must be done distantly from the register) also a separate transmitting device, there is used according to this invention, a testing lever which is caused to be slid along a whole row of numeral wheels, so that all of them are struck off by one and the same testing lever successively and their different positions are transmitted in the same manner by a single wire or lever connection to a single printing wheel, and the numbers successively printed by the latter as they are struck. A mechanism embodying this invention will be described hereinafter as a preferred form, in connection with an automatic calculating machine disclosed by British Patent No. 14,453 of 1905, which is a developement of a similar machine described in the U. S. Patent No. 809,075. To save drawing space only, the annexed drawings show a small machine of this type, with three digit places for the multiplicand, three digit places for the multiplier and three for the product.

In the accompanying drawings,

Figure 1 is a plan view, parts being broken away;

Fig. 2 is a front elevation, parts in dotted lines;

Fig. 3 is a cross section on the line 3—3 of Fig. 1; and

Figs. 4–6 are detail views of the printing hammer mechanisms and the paper carriage.

Referring to the drawings, the type of calculating machines in connection with which the present invention will be described, comprises a stationary portion or casing 1 in which must be slidably mounted a carriage 2. On the casing 1 are arranged the operating devices of the calculating machine, and a series of buttons 61 by which the operating devices can be adjusted, appear outside, and by means of which therefore, before a mutiplication, the multiplier, and before a division, the divisor must be set by the operator. The buttons 61 are shiftable along their scales, and their different positions indicate the different multiplier or divisor figures inserted into the operating devices. For this purpose there is shown, in the herein mentioned patents, connected with each button 61 and slidable with it, a pinion $9^x$ (Fig. 3), which pinion will be caused to mesh according to its adjustment with either one of the nine gear segments $4^x$ having different numbers of teeth, and thus pinion $9^x$ will be rotated an amount, which is predetermined by its position, upon each rotation of the gear segments $4^x$. The different rotations of the pinion $9^x$ is correspondingly transmitted by axis $10^x$, and bevel gears and gears $18^x$, to registering devices mounted on the carriage 2 and comprising numeral wheels 83, which—by this and other arrangements described fully in the mentioned patents—are operated to show the product in multiplication. On the carriage 2 there are also mounted a series of slidable buttons 62, which indicate figures by their different positions along their scales in a similar manner to buttons 61. Before a multiplication, the second factor (multiplicand) is set upon these buttons 62 by the operator. Whereupon the buttons 62 are successively readjusted to their zero position, during the following multiplication, by means of a worm $29^x$ and racks $28^x$, and the multiplication regulated in connection therewith automatically, all of which is set forth in the mentioned patents. For a division these buttons are left in their zero positions by the operator, and are thereafter, during the course of the division, adjusted automatically by the worm and racks to indicate the quotient. The automatic regulation for division is derived from the movements of the first left hand numeral wheel 83 and its catch $310^x$, which adjusts the regulating yoke $65^x$ by means of the parts $311^x$, $343^x$, $344^x$, $345^x$, $347^x$, $349^x$, $351^x$, and $66^x$, all of which is known by the said patents. There is further described, that this calculating machine is motor driven and automatically adds, subtracts, multiplies or divides according to which end of its slot (Fig. 1) an adjusting button 99 is displaced by the operator. As disclosed in British Patent 14,453 of 1905 the carriage travels automatically forwardly and backwardly (that means to the right and left of Fig. 1) during each multiplication and division. This movement will preferably be used also to slide the testing lever, for the purpose stated before, along the row of buttons 61 as well as along the numeral wheels 83 and along the buttons 62, in order to strike off the figures represented thereby and to transmit them accordingly to the printing devices. It has also been described in the mentioned patents that during any travel of the carriage 2, the main shaft of the calculating mechanism of the machine is held at rest, so that there can occur no interference by the testing lever sliding along and striking off the number rows with rotating numeral wheels or moving parts of the calculating mechanisms.

The printing mechanism for the multiplier row represented by the buttons 61 may be constructed after the principle explained as follows: With each button 61 there is connected a bracket 254 which has a fork or opening, which embraces the spindle 256 mounted in casing 1 (Fig. 1). The spindle 256 has a spiral groove 257, while in the opening of the bracket 254 a pin is fixed, which engages with said groove, so that on shifting a button 61 the grooved spindle 256 belonging to it will be rotated. Each spindle 256 extends through the wall 257' of the casing 1 and carries at its outer end an eccentric 258, as shown in Figs. 1 and 2, and said spindles will, therefore, stand in different positions dependent upon the positions of the buttons 61. Beneath each eccentric 258 a slide piece 259 is guided on the wall 257' and is ordinarily kept in its lower position by its own weight or the pull of a small spring 260. Under these slide pieces 259 is arranged as a testing lever an arm 262, which will be slid to the right of Fig. 2 by the carriage movement of the machine, in a manner to be described later on. It has at its left end a wedge surface 261, which, with the arm, rests upon a rail 266, which is constantly urged upward into the position shown in Fig. 2 by a spring 270', which spring must be relatively stronger than the springs 260 which act on said slide pieces 259. Then, if the arm 262 is drawn to the right of Fig. 2, its wedge surface 261, in being slid successively through between the different slide pieces 259 and the rail 266, will tend to push the same apart, and of course in doing so it will first move each slide piece 259 upward against the action of weaker spring 260 until such slide piece touches an eccentric 258 and consequently cannot be moved farther upward, whereupon the rail 266 is forced to give way a certain amount against the action of stronger spring 270'. As a result, the rail 266 will be pressed down farther, the farther downward the corresponding eccentric 258 is positioned. During such a sliding movement of the arm 262 to the right, the rail 266 will therefore alternatively be pressed downward by the wedge 261 and be pulled back again by the spring 270' into its initial position, so that an oscillating movement of the rail is produced, the different oscillations of which will correspond to the different figures inserted by buttons 61 into the operating devices. This varied movement is correspondingly transmitted to a printing wheel 250 in the following manner: The rail 266 has upwardly bent arms 270 which extend through openings in the casing 1, and to one of said arms is fastened a lever piece or link 271 (Figs. 1 and 3). This lever piece 271 is linked to a gear segment 272, which freely turns around an axis formed by a shaft 279 and is in mesh with a gear wheel 273. This wheel 273 is fastened upon an axis 274 in common with the printing wheel 250, and thus according to the different positions of the multiplier buttons 61 and their eccentrics 258 there will be effected successively different adjustments of the printing wheel 250 when the wedge 261 of the lever 262 is slid to the right of Fig. 2. Such sliding may best be effected as before mentioned in connection with the carriage movement of the machine, for instance in the following manner: The carriage 2 bears a rack 328 (Fig. 3) on its rear wall, by which is driven a gear wheel 329, which is fastened upon the shaft 330, to the other end of which is fixed a like gear 331, which drives a rack 332 (Figs. 2 and 3). The rack 332 can slide on a dovetail guide 332' of the casing, and has a bearing plate 263 fastened to it, to which is pivoted the arm 262 by means of a pivot screw 264, so that the arm 262 with the rack 332 will be drawn by the described gear arrangement if the carriage 2 is moved an equal distance, but in reverse direction. If for instance the carriage 2 is moved from its initial position shown in Fig. 1 to the left, the arm 262 with its wedge 261 will be moved from its initial position shown in Fig. 2 to the right, and thus cause, through the medium of testing lever 262, the described oscillation of the printing wheel 250.

It may be mentioned that for guiding the lever piece 271 parallel with the front of casing 1, it is linked below to a lever 275, which is pivoted in a journal bearing 276 of the casing. The same sort of parallel guiding can be provided at the right side of the rail 266 to effect a better guiding of the same.

The number set in the middle row by the buttons 62 may be printed after the same principle in the following manner: Over the buttons 62 there is arranged a testing lever 277, which extends upward through a hole 278 of the casing. It is fulcrumed on the axis 279 which is fastened in bearings 280 (Fig. 1) under the cover plate of the casing. During a travel of the carriage its buttons 62 are slid underneath the testing lever 277, so that the latter, which is constantly drawn down by a suitable spring 277' (Fig. 3) will be raised to different degrees by the different buttons according as a button is positioned toward the front or toward the back of its slot. The lifting of the said testing lever is effected by means of the inclined surfaces or wedges 281 and 282 which are located respectively on the said testing lever and on the buttons 62. As the lever 277 carries at its forward end a segmental gear 285 which is meshed with a gear wheel 286 mounted rotatably on the shaft 274 upon a sleeve, to the other end of which is fixed a printing wheel 251, therefore the movements of the testing lever 277 will oscillate the printing wheel 251 in accordance with the varying positions of the buttons 62.

The same principle may be applied to move another printing wheel in accordance with the number set on the numeral wheels 83, for instance in the following manner: Each of the numeral wheels 83 turns an eccentric 290 (Fig. 3). Opposite each eccentric 290 there lies a pin 291 of a slide piece 292, which is slidably mounted on the bearing plate 293 of the carriage as by means of a screw. Weak springs 294 draw the slide pieces 292 to the left of Fig. 3 and hold them usually as shown in this figure removed from the eccentrics 290, so that these and the numeral wheels can be turned freely by the operating devices, which will happen in this class of machines, as stated before, only while the carriage 2 is locked in its position. But when the carriage is moved, then in consequence and during such movement as will be clear from a look at Fig. 1 the different ends 296 of the slide pieces 292 projecting rearwardly out of the carriage casing will successively come to slide over a single wedge surface 297 (Fig. 1) as the carriage proceeds, and therefore will successively tend to either press this wedge backward or otherwise the slide pieces 292 will be pressed against the eccentrics 290 by the wedge. The wedge surface 297 is arranged upon a lever 300 (Fig. 3), which lever is rotatably suspended on a shaft 302, which is journaled in bearings fixed in the upper rail 301 of the casing 1. The lever 300 is pulled forward by a spring 300', which is stronger than the weak springs 294. In consequence thereof each slide piece 292 will, when it comes to slide over the wedge surface 297, (and this will be well understood—just only in such moment,) first be pressed against their eccentric 290, and after it has been so pressed and the slide piece 292 can not be moved any farther to the right of Fig. 3, then the wedge surface 297 with the lever 300 will have to give way and be moved farther to the left of Fig. 3, the farther to the left the eccentric 290 will just have been positioned. But (this will also be understood) as soon as each slide piece 292 has passed the wedge surface 297 it will immediately be pulled back to the left by its own spring 294, so that the eccentrics and the numeral wheels are again free to be turned by the operating devices. In this connection attention is called to the fact that the wedge surface 297 will be so placed in the machine, that it will always come to stand in the middle between two slides 292 if the carriage is locked in one of its working positions for the operating of the numeral wheels by the operating devices. Therefore, though the spring 300' is described as stronger than the springs 294, the slide pieces 292 can never be held in engagement by the spring 300' with the cams 290 when these cams are rotated, and in no direction of movement of the cams can block such movement.

The varying movement of the lever 300 is transmitted by a link 305 to a lever 306, which is journaled on the shaft 279 and carries a segmental gear 307, which transmits the movement to a gear wheel 308, which is journaled on a sleeve in common with a printing wheel 252. Therefore the movement of the wedge surface 297 will oscillate the printing wheel 252 in accordance with the varying positions of the eccentrics 290 and of the numeral wheels 83 of the registering devices.

But in that class of calculating machines, in connection with which the printing apparatus is demonstrated herein, there are usually twice as many digit places in the registering devices as the carriage has traveling range. In Fig. 1 for instance there is shown a calculating machine with six numeral wheels 83, so that according to the necessities of the printing apparatus just explained the carriage 2 would have to shift six digit places to the left in order to have all six slides 292 of the numeral wheels pass the wedge 297 to adjust the printing wheels to print the six figures represented by the numeral wheels 83. But according to the general custom in building such calculating machines, manufacturers will mostly make the carriage 2 travel three digit places only. In such case it will be of advantage to divide the printing apparatus for the numeral wheels in two parts, the first part of which will consist of the first three numeral wheels to the left, which part will be printed as just described by means of the wedge 297 and the printing wheel 252. The second part, consisting of the remaining three numeral wheels to the right, will be printed during the same three carriage steps by means of a repetition of the printing apparatus for the first three numeral wheels. It consists in a wedge 298 (Fig. 1) swinging on a lever 310, which is fixed on the shaft 302 and repeated as lever 311 at the left of this shaft, so that the lever 311 can transmit the movement of the wedge 298 by a link 312, a gear segment 313 and a gear 314 to a printing wheel 253, which is arranged for the printing of the right hand part of the numeral wheels 83 at the proper place, i. e. to the right of the printing wheel 252, which prints the three left hand figures of the same row of wheels 83.

It has hereinbefore been described only how the printing wheels are set. If the printing is to be properly effected, then it must take place every time a printing wheel is oscillated at the right moment, and the paper carriage must be so shifted that the single figures, printed successively by the printing wheels, are set one to the side of the other, to their proper place values, on the paper. The paper carriage itself is best seen in Figs. 5 and 1. Said paper carriage is shiftable on stationary guide rods 320 and carries a shaft 322 upon which the paper roll 324 is mounted. The paper from this roll is then guided in between the printing wheels and the hammers 336 by the rollers 325 and 326, which are journaled in the frame of the paper carriage. Of course there may advantageously be also mounted as well on the paper carriage as on the printing wheels any of the numerous mechanisms, which have proved to be useful with any other printing apparatus of a typewriter or a calculating machine (as: ribbon mechanisms or ink rolls, line spacer, paper retainer and loosener, etc., etc.) but as the printing apparatus described does not distinguish in those mechanisms from any other known, or offers no special difficulty in applying them, it has not been thought necessary to describe any such details in this specification. On the other hand it is really a special problem of the present invention, to construct the moving mechanism of the paper carriage in accordance with the movements of the testing levers in striking off the number rows. As this movement is derived in the present example of construction from the movement of the carriage 2, the corresponding necessary construction for the paper carriage will be, that as the carriage 2 is moved the distance of one digit place in the calculating machine, the paper carriage will correspondingly have to be moved differentially, the smaller distance of one digit place of the printing column. For this purpose the paper carriage is provided with a rack 327 (Figs. 2 and 5) which is slowly moved by a small gear 335 fastened to an axis 334 in common with a larger gear 333, which is driven by the rack 332, which has already been described as moved in accordance with the movements of the carriage 2 (by the gears 328 and 331, Fig. 3). The gear arrangements will be thus: that all the highest points of the testing lever wedges (261, 281, 297, 298,) will at the same time be opposite a corresponding slide or button (259, 282, 292) which movement may by choice be prolonged by flattening the points of the wedges and slides. At the same moment the paper carriage must be in a correct printing position and the hammers must strike against the paper. This striking of the hammers 336 may be caused by the following means: On the shaft 330 is keyed a disk 337, which carries a wedge 338 (Fig. 3). This wedge will upon each right or left rotation of the shaft 330 strike against the front end 339 of a lever 340 (Fig. 4) thereby pushing it back, and the wedge will pass the lever just in time, to release it again when the printing is to take place. Said lever is journaled on the stationary casing 1 upon a pivot screw 341 and with its front end 342 will press back a lever 343, which is fastened together with shafts 345 and 346 to a lever 344, all of which together form a frame, which can swing around its shaft 345, which is journaled in suitable bearings of the casing 1. The upper shaft 346 extends through slots 347 of the hammers 336. A spring 348 draws the frame to the right of Fig. 5. If therefore the lever 340 becomes free again after it had been pressed back by the wedge 338, the spring 348 will urge the frame 343, 344 forwardly into that position, in which it is retained by the stop lug 350. In this position the hammers are not yet positively pressed against the printing paper by the rod 346. But they may in this position by their own inertia and the play of shaft 346 come to strike against the paper, provided of course that they are not prevented from doing so by some other mechanism. This will be well understood. It will be necessary to provide such a printing preventing mechanism, or else the different rows of figures would always be printed as well at the forward as at the backward travel of the carriage, which is not desirable. Therefore the striking of the hammers against the paper can at choice be prevented by suitably arranged catches 358 (Figs. 4 and 5) on the printing hammers working together with stops 357 for instance of a slide 355 (Figs. 6, 1 and 5) so that one or the other of the printing hammers may in every position of such a slide 355 strike or strike not against one of the stops 357, and thus be or be not prevented from striking the paper, i. e., from printing. The slide 355 is connected in the present machine to the adjusting button 99 by means of a lever 101 (Fig. 1), which turns around its bearing 102 and has a pin 101$^s$ extending into the slot 355$^s$ of the slide 355 and also embraces with its forked front end the said adjusting button 99. In the English Patent No. 14,453 of 1905 it has been described, that in this class of calculating machines during the performance of a multiplication the button 99 rests in the position marked "M" in Fig. 1 and during a division in the position marked "D" in Fig. 1. After the completion of a multiplication (or division) this button will according to the mentioned patent automatically be shifted to the places marked "M$r$" (or "D$r$" respectively) in Fig. 1. During a multiplication or division, when the button 99 stands at M or D, the carriage 2 of the machine is described in this patent to travel from right to left of Fig. 1, but after the end of such operations, after the button has been returned to one of the places marked M$r$ or D$r$ the carriage of the machine will return to its right end position of rest. The printing as described in the present invention takes place during and in consequence of a carriage travel and the printing hammers may by the working of the slide 355 be caused for each of the printing wheels 250, 251, 252, 253, and for each kind of operation at choice, separately and independently, to strike off the printing wheels either during the forward or during the backward travel of the carriage. For instance, the buttons 62 must be according to the said English patent adjusted by the operator corresponding to the multiplier before a multiplication can be started, and these buttons are thereafter automatically returned to their zero positions in the course of the then following automatic multiplication. The positions of the buttons 62 must therefore be printed before these buttons are returned to zero by such multiplication. On the other hand, these circumstances are reversed in division. Because, when the machine is started for a division the buttons 62 are now left in their zero positions by the operator, but are thereafter automatically moved during the division to such places, that they indicate the quotient. They remain in those positions, which ought to be retained in print now, while the carriage returns after a completion of a division. Therefore for division the positions of the buttons 62 ought to be printed during the return of the carriage. To comply with these necessities suitable stops 357 have to be arranged for that one printing hammer which is opposite the printing wheel 251 and therefore strikes off the positions of the buttons 62. One stop will be necessary to prevent the printing in the position M$r$ of the button 99, the other in the position D of this button. The example given will make it clear that any necessary arrangement can be made in this respect with the device shown.

While it is true, that the movement of the paper carriage will not stop during the striking of the hammers, this movement is too slow, to cause any perceptible smearing of the types.

It is obvious that the described invention is susceptible of modification as parts may be added, parts substituted and parts changed without departing from the scope of the invention as pointed out in the claims.

I claim as my invention:—

1. In a calculating machine, the combination with recording devices, of a row of two or more slidable buttons which are set to indicate a certain figure to be recorded, a movable lever connected with the recording devices, and means to move the row of buttons indicating the figure to be printed laterally of the movable lever and to adjust the same thereby according to this figure.

2. In a calculating machine, the combination with recording devices, of a row of two or more numeral wheels which are set to indicate a certain figure to be recorded, a movable lever connected with the recording devices, and means to move the row of numeral wheels indicating the figure to be recorded laterally of the movable lever and to adjust the same thereby according to this figure.

3. In a calculating machine, the combination with recording devices, of a row of two or more stepped disks set to indicate a certain figure to be recorded, a movable lever connected with the recording devices, and means to slide the lever along the row of disks indicating figures to be recorded and to oscillate the lever thereby according to these figures.

4. In a calculating machine, the combination with recording devices, of two or more devices each indicating a selected figure to be recorded, a movable member connected with the recording devices, and means to establish a successive working connection between the devices indicating the two or more selected figures to be recorded and the single movable member connected with the recording devices.

5. In a calculating machine, the combination with two or more registering devices comprising stepped disks, of slides movable against the stepped disks to different extents depending upon the position of each disk, a member movable along said slides and adapted to be thereby oscillated in a manner, depending upon the possible movements of said slides, and means connected with said oscillated member to record the positions of the registering devices.

6. In a calculating machine, the combination with two or more registering devices, of means movable against the registering devices to different extents depending upon the position of each registering device, a member adapted to be oscillated in a manner depending upon the possible movements of aforesaid means, and means connected with said oscillated member to record the positions of the registering devices.

7. In a calculating machine, the combination with two or more registering devices, of a single printing means for the same, means to set figures into the registering devices independently of an adjusting of the printing means, and adjusting means independent of the setting means for the registering devices to adjust thereafter the single printing means to accord in succession with one after the other of the figures represented by the registering devices.

8. In a multiplying machine, the combination with a multiplicand register, product wheels, a multiplying mechanism communicating between the multiplicand register and the product wheels, means for operating the multiplying mechanism to register the partial products in the wheels, means for performing the required addition, a platen, and devices for recording the multiplier, the multiplicand and the product on the same platen.

9. In a dividing machine, the combination with a divisor register, dividend wheels, a dividing mechanism communicating between the divisor register and the dividend wheels, means for operating the dividing mechanism to deduct the partial products from the wheels, means to register the quotient, a platen, and devices for recording the dividend, the divisor and the quotient on the same platen.

10. In a calculating machine, the combination with a row of figure representing devices, of printing means to print the figures represented therein, operating mechanism to perform different calculating operations, adjusting means to adjust the operating mechanism for the performance of the different calculating operations, and means regulating the printing means to take the imprint either before or after such a calculating operation, dependent upon the different position of the adjusting means.

In testimony whereof I affix my signature in the presence of two witnesses.

ALEXANDER RECHNITZER.

Witnesses:
ROBERT W. HEINGARTNER.
AUGUST FUGGER.